United States Patent [19]
Miyaguchi et al.

[11] Patent Number: 6,128,733
[45] Date of Patent: Oct. 3, 2000

[54] PROGRAM LOADING METHOD AND APPARATUS

[75] Inventors: Hiroshi Miyaguchi, Tokyo; Naoya Tokunaga, Moriguchi, both of Japan

[73] Assignees: Texas Instruments Incorporated, Dallas, Tex.; Matsushita Electric Industrial Co., Ltd., Osaka, Japan

[21] Appl. No.: 09/165,574

[22] Filed: Oct. 2, 1998

[30] Foreign Application Priority Data

Oct. 3, 1997 [JP] Japan ........................... 9-288060

[51] Int. Cl.[7] .................................................. G06F 15/177
[52] U.S. Cl. ............................................ 713/2; 713/1
[58] Field of Search ................................ 713/1, 2; 711/1, 711/100, 102, 103; 712/205, 211, 247, 248

[56] References Cited

U.S. PATENT DOCUMENTS

| | | | |
|---|---|---|---|
| 5,497,492 | 3/1996 | Zbikowski et al. ................ | 395/700 |
| 5,594,903 | 1/1997 | Bunnell et al. ..................... | 717/11 |
| 5,671,413 | 9/1997 | Shipman et al. ................... | 713/2 |
| 5,913,058 | 6/1999 | Bonola ................................ | 713/2 |

*Primary Examiner*—Reba I. Elmore
*Assistant Examiner*—Nitin Patel
*Attorney, Agent, or Firm*—Bret J. Petersen; Frederick J. Telecky, Jr.

[57] ABSTRACT

A method for loading of program data with high speed and efficiency along with eliminating the need for software modification even if changes occur in the storage addresses and data length of the program data stored in the program memory. In order to load program data in a rewritable manner into a number of functional circuits FC0, FC1, . . . , FCn operating in accordance with the supplied program data, a program memory, for example, a ROM 10, a program loader 12, and program designating apparatus, for example, a microprocessor 14, are provided in the system. In the ROM 10, multiple address pointers are stored in specified storage areas, and corresponding sets of program data are stored in the storage locations indicated by the address pointers in such a manner that a first set of program data is stored in the specified storage area which utilizes the address corresponding to the first address pointer as the start storage address, and a second set of program data is stored in the specified storage area which utilizes the address corresponding to the second address pointer as the start storage address.

9 Claims, 6 Drawing Sheets

PROGRAM LOADING METHOD AND APPARATUS

FIELD OF THE INVENTION

The present invention relates to a method and an apparatus for loading the desired program data into functional circuits carrying out specified operations in accordance with supplied program data.

BACKGROUND OF THE INVENTION

In systems provided with this type of functional circuit or circuits, implementation of various kinds of operating modes or applications is made possible by changing programs or set value (called program data hereinbelow) loaded into functional circuits.

This type of conventional system is adapted to pre-store (prepare program data) of various types or many sets thereof in memory, and, in response to a requested application, the microprocessor reads out a set of program data from the memory and loads the program data into functional circuits. For this reason, the microprocessor needs to hold the storage addresses for all the sets of program data in memory in advance.

When, however, changes concerning the data length of the program data stored in memory occur due to system version upgrades and the like, the addresses or storage locations of program data sets stored in memory are inevitably changed. In such a case, software must be corrected in accordance with such changes concerning program data storage addresses on the microprocessor side, which is extremely burdensome.

Also, in the system in which the above-mentioned microprocessor reads out program data from memory and stores it into functional circuits, the microprocessor itself carries out processing while successively reading out and decoding the control program from memory, which is the reason this is time-consuming and it is difficult to carry out program storage quickly. Therefore, this was not intended for systems that must operate immediately after turning it on or after a mode change.

The present invention solves the problems of the prior art and one object of the invention is to provide a program loading method and apparatus adapted to carry out loading processing of program data without the need for changes in the software even if changes in storage addresses or data length of the program data stored in the program memory do take place.

Also, another object of the present invention is to provide a program loading method and apparatus adapted to carry out loading processing of program data at high speed and efficiency.

SUMMARY OF THE INVENTION

To accomplish the above-mentioned objectives, the invention according to a first embodiment is a program loading method for loading the desired program data in one or more functional circuits carrying out specified operations in accordance with supplied program data, with the program loading method having a step in which a plurality of sets of program data are held by storing them separately for each set in specified storage areas in a program memory along with holding address pointers indicating the storage addresses of each set of program data at predetermined storage addresses in the above-mentioned program memory, a step in which program designation information corresponding to any single pointer among the above-mentioned address pointers is given in order to designate the desired set of program data, a step in which, based on the above-mentioned program designation data, the above-mentioned address pointers corresponding thereto are read out, and the storage addresses of the sets of program data that the above-mentioned program designation information designates are computed in accordance with the read-out address pointers, and a step in which the sets of program data that the above-mentioned program designation information designates are read out from the above-mentioned computed storage addresses and the read-out program data are transferred to the above-mentioned corresponding functional circuits.

The invention according to a further embodiment is the program loading method in which a group of program data corresponding to the above-mentioned functional circuits are stored at consecutive storage addresses in the storage areas in which sets of program data are stored in the above-mentioned program memory.

The invention according to another embodiment is the program loading method in which transfer destination identification information used for determining which of the above-mentioned functional circuits to serve as transfer destinations is contained in a specified first portion of each group of program data.

The invention according to a further embodiment is the program loading method in which transfer program length information used for representing the length of the program data to be transferred to the above-mentioned functional circuits which are to serve as transfer destinations is contained in a specified second portion of each group of program data.

The invention according to the above-mentioned program designation information represents the storage addresses of the above-mentioned pointer information corresponding thereto.

Also, another embodiment is the program loading method in which a program loading apparatus loading the desired program data in one or more functional circuits carrying out specified operations in accordance with supplied program data, wherein the program loading apparatus is constructed so as to have a program memory holding a plurality of sets of program data by storing them in specified storage areas along with holding address pointers indicating the storage addresses of each set of program data at predetermined storage addresses, a program designating means giving program designation information corresponding to any single pointer among the above-mentioned address pointers in order to designate the desired set of program data, a program loader which, based on the above-mentioned program designation information from the above-mentioned program designating means, reads out the above-mentioned address pointers corresponding thereto and, by accessing the storage addresses of the sets of program data that the above-mentioned program designation information designates in accordance with the read-out address pointers, reads out the sets of program data that the above-mentioned program designation information designates and transfers the read-out program data to the above-mentioned corresponding functional circuits.

The invention according to another embodiment is the program loading apparatus in which memory access time settings representing the access time set for the above-mentioned program memory are stored in specified storage locations in the above-mentioned program memory, with the above-mentioned program loader adapted to start the reading of program data from the above-mentioned program memory according to a preset low-speed access time and carry out the reading of program data from the above-mentioned program memory in accordance with the access time indicated by the above-mentioned memory access time settings after having read out the above-mentioned access time data.

The invention according to another embodiment is the program loading apparatus which is constructed so that a group of program data corresponding to the above-mentioned program loader is stored in the header of each set of program data indicated by the above-mentioned pointers, with the above-mentioned memory access time settings contained in the group of program data.

DESCRIPTION OF THE EMBODIMENTS

Embodiments of the invention are explained hereinbelow by referring to the attached drawings.

Figure 1:
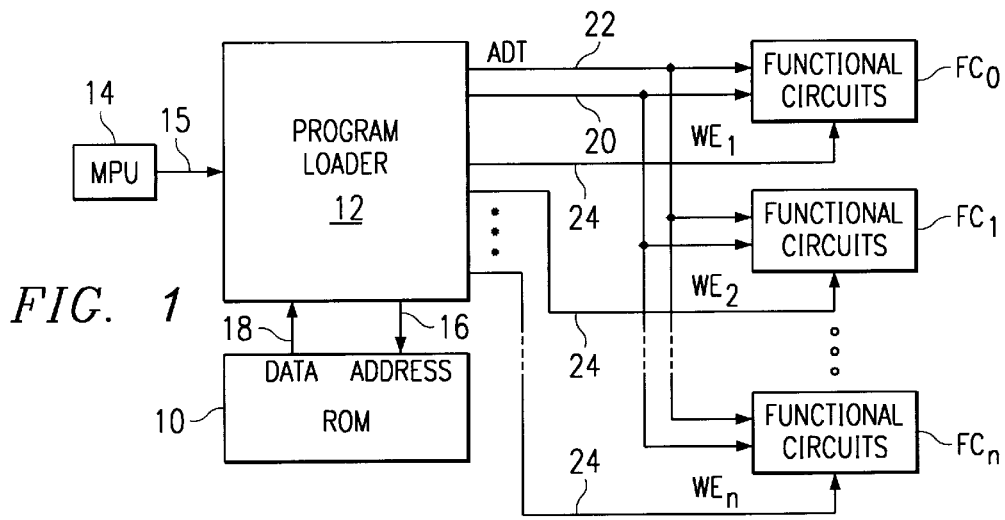
FIG. 1 is a block diagram showing a basic configuration of a system utilizing the method and apparatus for program data loading of the present invention.

FIG. 1 shows the basic configuration of a system utilizing a program loading method and apparatus according to the embodiment of the present invention.

This system contains (n+1) functional circuits FC0, FC1, . . . , FCn, with each one of them operating in accordance with supplied program data (programs or set value). Then, a memory for program storage, for example, a ROM (Read-only Memory) 10, a program loader 12, and a program designation unit, for example, a microprocessor (MPU) 14, are provided for loading program data in rewritable fashion into these circuits. Among them, the microprocessor 14 may function as a unit essentially external to the system.

In addition, as will be described later, the program loader 12 can be added to one of the functional circuits FC in the system.

In this system, a plurality of operating modes or applications are prepared, and a set of program data intended for all the functional circuits FC0, FC1, . . . , FCn is produced or set for each operating mode. Multiple program data sets corresponding to the respective multiple operating modes are stored together in the ROM 10.

The program loader 12 is connected to the ROM 10 via an address bus 16, data bus 18 and the required control lines (not shown). Also, it is connected to the microprocessor 14 via an appropriate bus or communication interface 15.

Also, the program loader 12 is connected to the functional circuits FC0, FC1, . . . , FCn via a common address/data internal bus 20 and a required control line, such as a bus signal identifying line 22 used for determining whether the signal on the bus 20 is an address signal or data, or a write control line 24 used for selectively writing the data on the internal bus 20 only to one of the functional circuits FCi, and the like.

Figure 2:
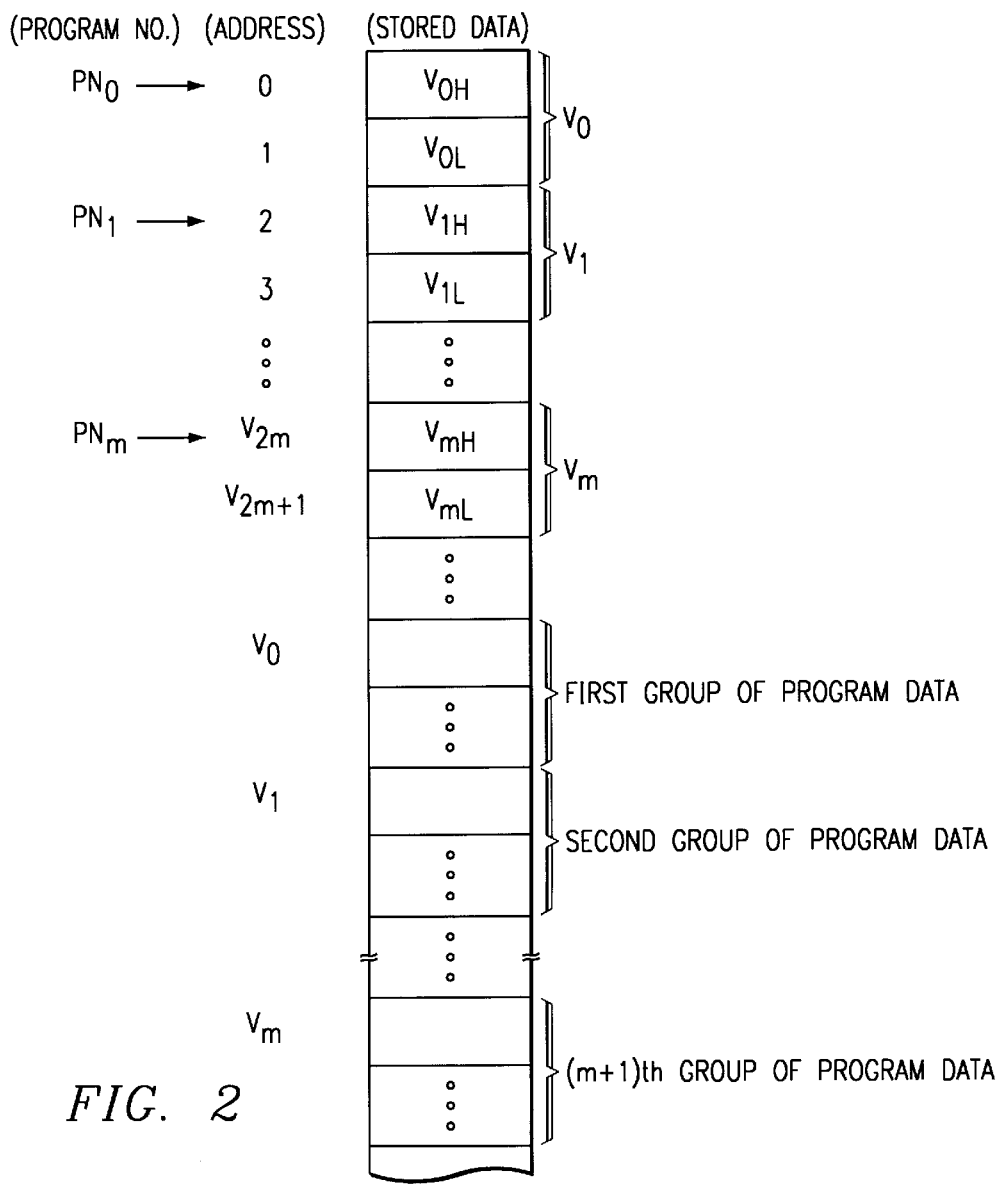
FIG. 2 is a figure showing an example of an arrangement used for storing in the memory areas of the program memory (ROM) in the system according to the embodiment.

FIG. 2 shows an example of an arrangement of data (memory map), as stored in the memory area of the ROM 10.

If in the ROM 10, for instance, data is 8 bits and addresses are 16 bits, it has a memory capacity of $8 \times 2^{16}$ bits. In the example of FIG. 2, an m+1 (m is an integer portion of address pointers V0~Vm are stored in the storage area with addresses 0~V2m+1.

Here, because each address pointer VK (K=0~m) has a data length of 16 bits, it is divided into a high byte (8 bits) VKH and a lower byte (8 bits) VKL and written to two addresses. For example, when m is 255, it is possible to set up to 256 address pointers in the ROM 10, which means that up to 256 sets of program data can be stored therein.

In connection with the above-described setting of address pointers, corresponding sets of program data are stored in storage locations indicated by the address pointers in the ROM 10 in such a manner that a first set of program data is stored in a specified storage area which uses the address V0 corresponding to a first address pointer V0 as the starting storage address, a second set of program data is stored in a specified storage area which uses the address V1 corresponding to a second address pointer V1 as the starting storage address.

In this type of memory management system, the program designation information used for designating program data sets, for instance, program numbers PN, may designate the corresponding address pointers. In this manner, it becomes possible to directly determine the storage locations of the target program data from the designated address pointers.

Figure 3:
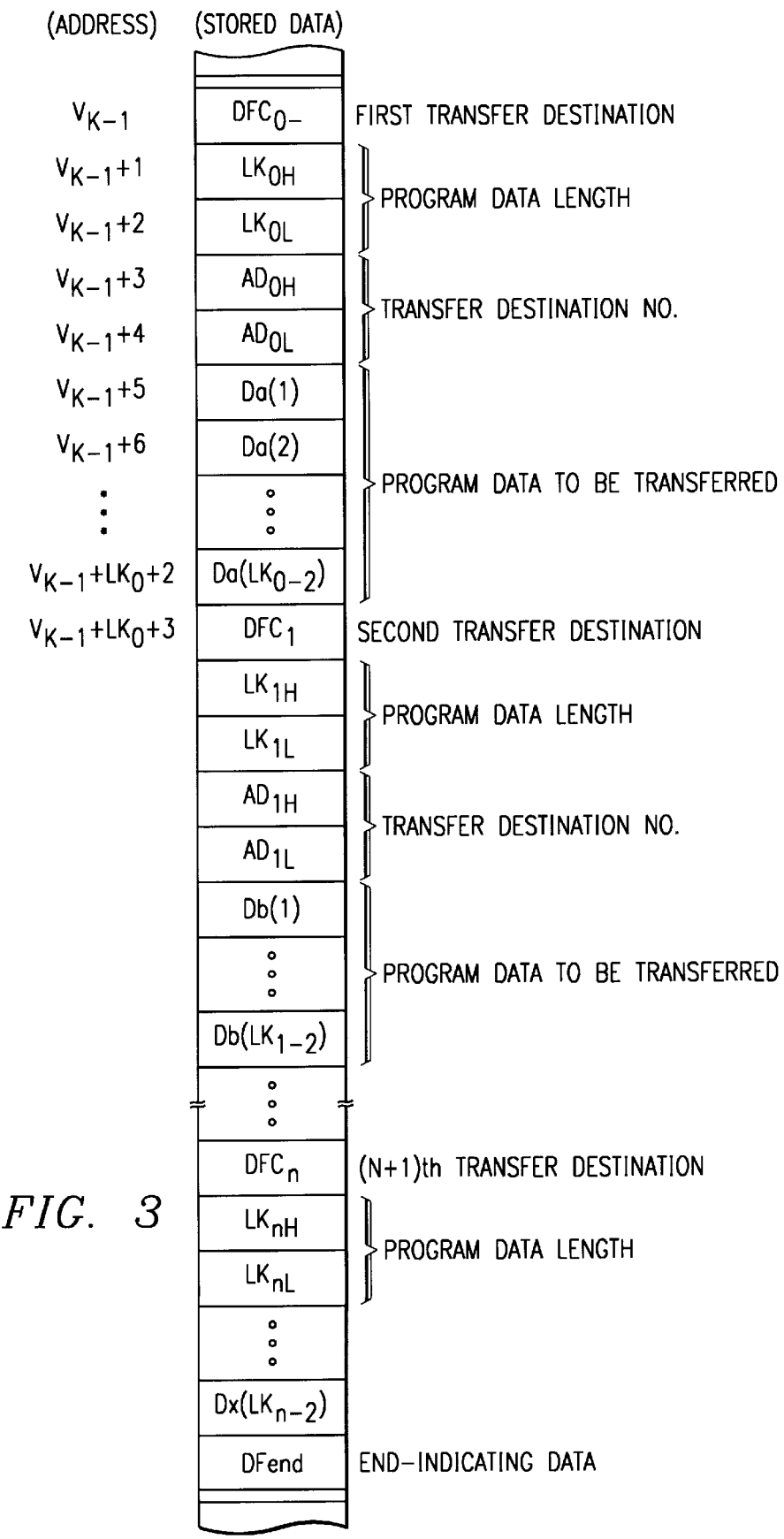
FIG. 3 is a figure showing an example of a storage arrangement and contents of program data sets stored in the program memory (ROM) in the system according to the embodiment.

FIG. 3 shows an example of a storage arrangement and data contents of a set of program data (the Kth set) stored in ROM 10.

First of all, single-byte data DFC0 used for discriminating the functional block FC (for example, FC0) serving as a first transfer destination is stored in a starting address VK-1. Data LK0 obtained by adding 2 to the value of the data length (byte number) of the program data to be transferred to the first transfer destination is stored as two bytes (LK0H, LK0L) in the two subsequent addresses VK-1+1, VK-1+2.

Next, 2-byte data AD0 (AD0H, AD0L) showing the start storage addresses of the registers or memory to which program data is to be written in the first transfer destination (functional circuit is stored as transfer destination addresses in the next fourth and fifth addresses VK-1+3 and VK-1+4.

Program data to be loaded into the first transfer destination (functional circuit) is stored in addresses in single-byte units Da(1), Da(2), . . . across addresses ranging from the next sixth address VK-1+5 to the address corresponding to (program data length LK0□²).

As was described above, a first group of program data corresponding to the functional circuit serving as the first transfer destination is stored in consecutive storage addresses (VK-1, VK-1+1, VK-1+2, . . .) in the starting portion of a Kth set of program data.

The final address of the above-mentioned first group of program data is VK-1+LK0+3□¹. In this formula, the third term, i.e., the constant 3, corresponds to the three addresses allocated to DFC0, LK0H, LK0L.

A second group of program data corresponding to a functional circuit serving as a second transfer destination is stored in the same format as the above-mentioned first group, starting from the address (VK-1+LK0+3) after this final address (VK-1+LK0+3□¹). The program data length of the program data Db(1), Db(2), . . . which is to be transferred depends on the specifications or memory capacity of the program data storage means (memory or registers, etc.) at the second transfer destination.

Starting from the third transfer destination, corresponding groups of program data are successively stored in the memory areas of the ROM 10 in the same format as the one described above. Then, end-indicating data DFend showing that this set (the Kth set) of program data ends here is stored in the next address following the storage location at which the group of program data corresponding to the last transfer destination is stored.

Figure 4:
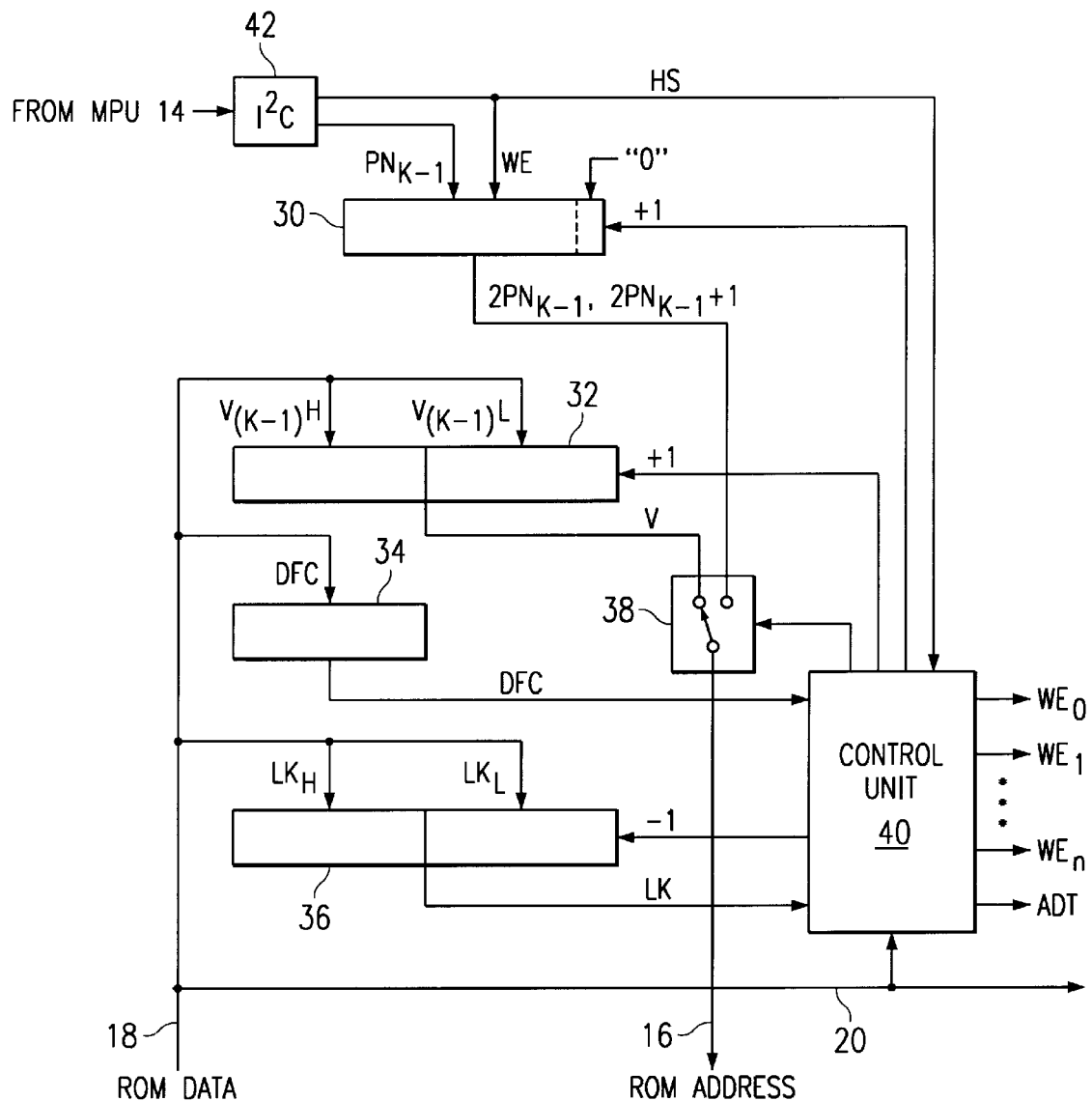
FIG. 4 is a block diagram showing a circuit configuration of a program loader in the system according to the embodiment.

FIG. 4 shows an example of a circuit configuration of the program loader 12. The program loader 12 consists of a number of registers 30–36 where various information or data is temporarily input and held, address changeover switch 38, and a control unit 40 controlling various units in the loader and external functional circuits and the like. In this example, the program loader 12 is connected with the microprocessor 14 via an I²C bus (Inter IC-Bus) interface circuit 42.

Figure 5:
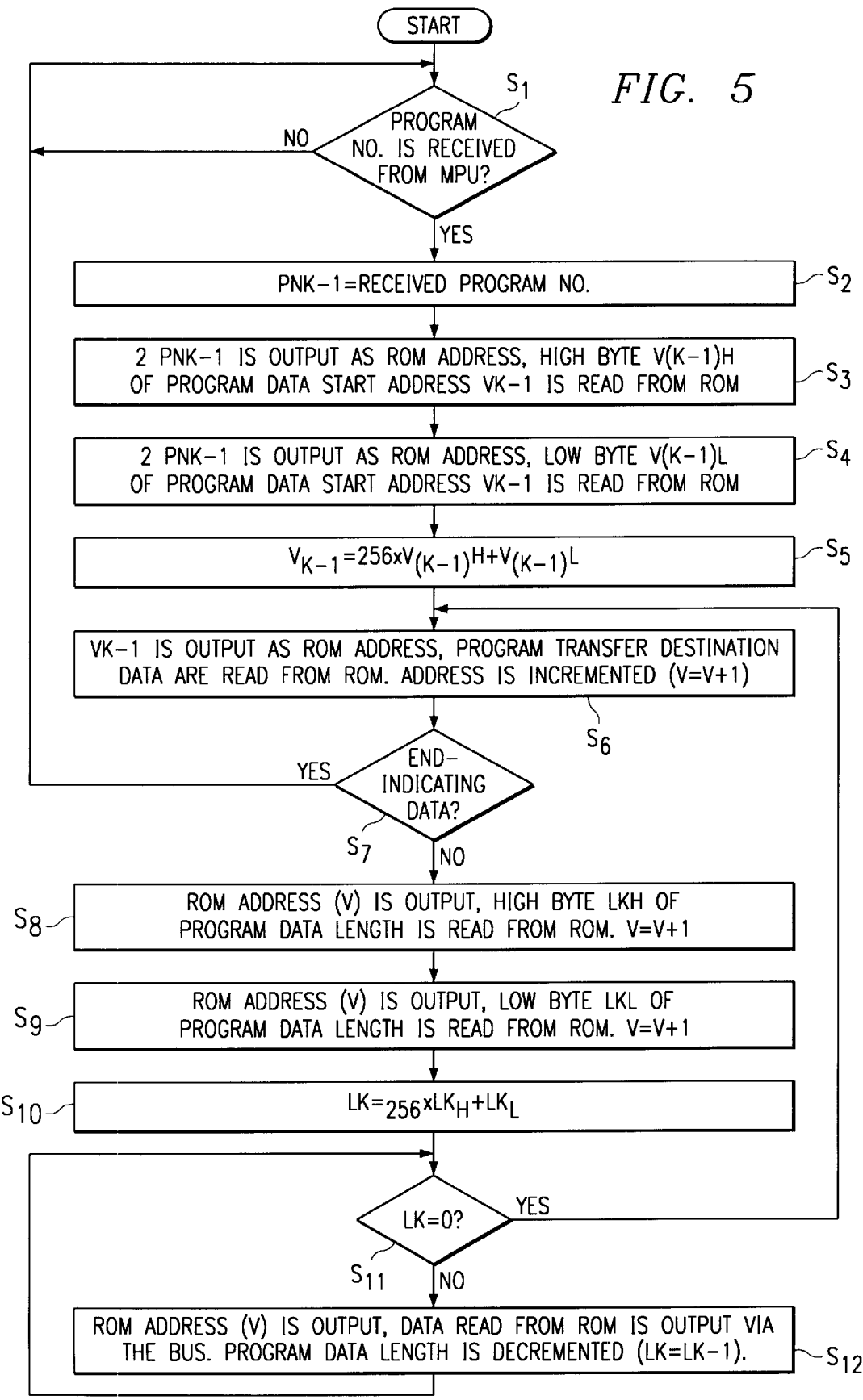
FIG. 5 is a flow chart used for the explanation of the operation of a control unit of a program loader in the system according to the embodiment.

FIG. 5 shows a flow chart showing the controlling or processing operation of the control unit 40 in the program loader 12.

Figure 6:
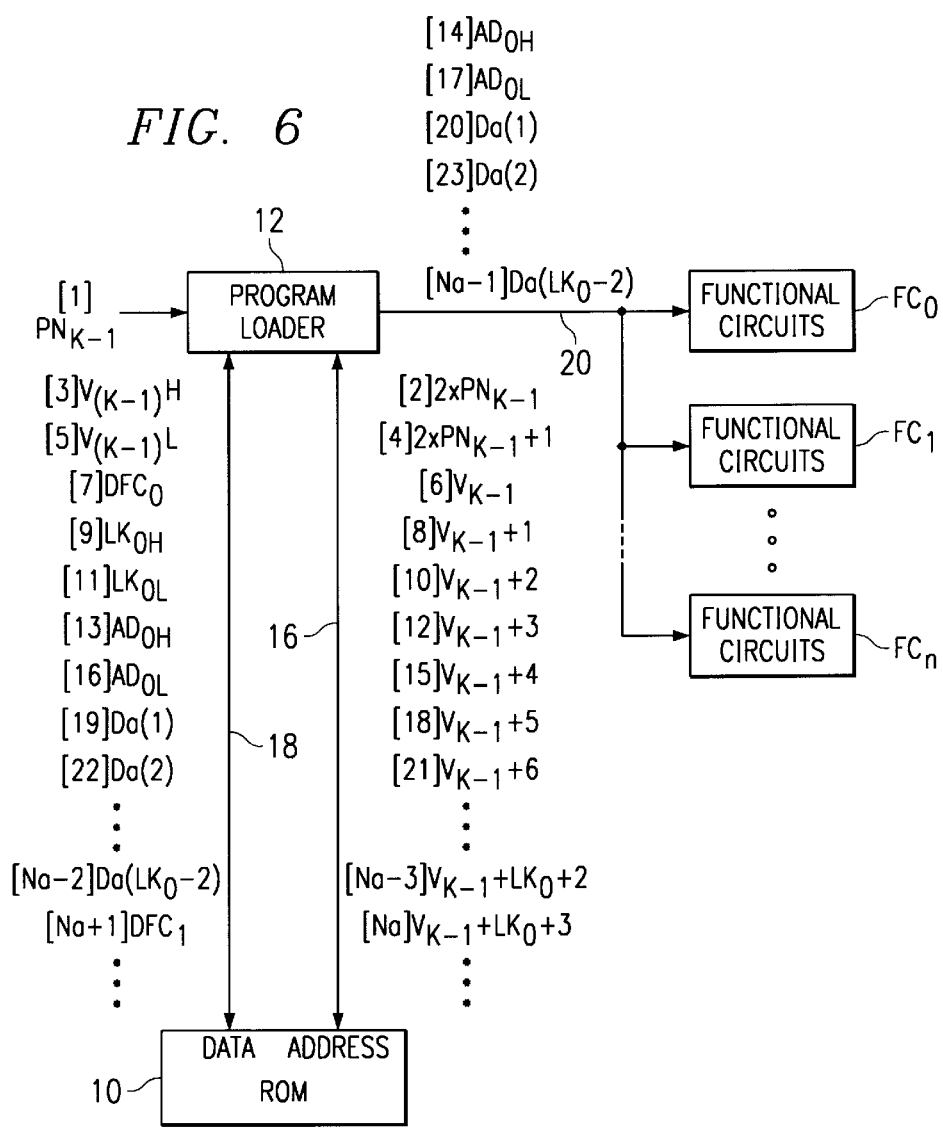
FIG. 6 is a block diagram used for the explanation of the operation of a control unit of a program loader in the system according to the embodiment.

The operation carried out when the program loader 12 reads out the Kth set of program data from the ROM 10 and loads it into the functional circuits of the system is explained hereinbelow. In addition, FIG. 6 shows the distribution of data or associated address signals transmitted via various routes and more detailed steps in the case of loading the first group of program data in the Kth set of program data to the first transfer destination, for instance, the functional circuit FC0.

First of all, immediately after turning the system power on, or immediately after switching over to another operating mode, a program number PNK-1 designating the desired set (in this example, the Kth set) of program data is sent from the microprocessor 14 to the program loader 12.

When the I²C bus interface circuit 42 receives the program number PNK-1, along with transmitting a handshake signal HS notifying the control unit 40 of this event, the received program number PNK-1 is loaded into the register 30. Here, the signal HS operates as a write enable signal WE of the register 30.

When the control unit 42 [sic; 40] receives the above-mentioned handshake signal HS, it initializes each unit in the program loader 12. In particular, as far as the address changeover switch 38 is concerned, the output terminal (ROM address output terminal) may be switched over to the input terminal) on the register 30 side (Steps S1, S2).

When the program number PNK-1 is loaded into the register 30, the data bits are shifted to the left one place and a "0" is inserted in the lowest bit position. As a result, data in the register 30 represent a value twice as great as the program number PNK-1 (2□ᴾᴺᴷ-1).

Thus, data (2□ᴾᴺᴷ-1) from the register 30 is output to an address bus 16 via the switch 38 as a first ROM address, and data in the storage location designated by this ROM address (2□ᴾᴺᴷ-1), in other words, the high byte V(K-1H) of the address pointer VK-1, is read from the ROM 10 to a data bus 18 (Step S2).

The high byte V(K-1H of the address pointer VK-1 read from the ROM 10 is loaded into the register 32 in the program loader 12.

Next, the control unit 40 increments the contents of the register 30 by one, making it 2□ᴾᴺᴷ-1. Thus, data (2□ᴾᴺᴷ-1+1) in the register 30 is output to the address bus 16 via the switch 38 as a second ROM address, and data in the storage location designated by this ROM address (2□ᴾᴺᴷ-1+1), in other words, the low byte V(K-1)L of the address pointer VK-1, is read from the ROM 10 to the data bus 18 (Step S4).

The low byte V(K-1)L of the address pointer VK-1 read from the ROM 10 is loaded into the register 32 in the program loader 12.

At this time, a 2-byte address pointer VK-1 is obtained (Step S5) by shifting the high byte V(K-1)H, which was loaded before, left by 8 bit positions, in other words, carrying out multiplication by 256, and setting (adding the low byte V(K-1)L in the bit positions underneath. This address pointer VK-1 is an address that shows the start storage address of the storage location, where the Kth set of program data is stored.

On the other hand, the control unit 40 switches the address changeover switch to the register 32 side. Thus, the address pointer VK-1 is output to the address bus 16 via the switch 38 as a third ROM address, and transfer destination identification data DFC0, which indicates the start data of the Kth set of program data, in other words, the first transfer destination, is read out (Step S6) from the ROM 10.

The transfer destination identification data DFC0 that has been read from the ROM 10 is loaded into the register 34 in the program loader 12, and the control unit 40 recognizes the functional circuit FC to serve as the first transfer destination based on the contents of the register 34 and activates the write enable signal WE with respect to this functional circuit.

Immediately after reading from the ROM, the control unit 40 increments the contents of the register 32 by one (Step S6). Therefore, next, the following address (VK-1+1) after the start storage address VK-1 is output as a ROM address from the register 32 via the switch 38 to the address bus 16, and the high byte LK0H of the program data length LK0 for the first transfer destination is read out from the ROM 10 to the data bus 18 (Step S8). Immediately thereafter, the control unit 40 increments the value of the register 32 by one.

In addition, the above-mentioned high byte LK0H of the program data length LK0 read from the ROM 10 is loaded into the register 36 in the program loader 12.

Next, an address (VK-1+2) is output via the switch 38 from the register 32 to the address bus 16, and the low byte LK0L of the program data length LK0 for the first transfer destination is read from the ROM 10 (Step S9). Immediately thereafter, the control unit 40 increments the value of the register 32 by one.

The low byte LK0L of the program data length LK0 that has been read out is also loaded into the register 36. At this time, a 2-byte program data length LK0 is obtained (Step S10) by shifting the high byte LK0H, which was loaded before, to the left by 8 digit positions, in other words, carrying out multiplication by 256, and then setting (adding) the low byte LK0L in the bit positions underneath. The control unit 40 can read the contents of the register 36.

Next, an address (VK-1+3) is output via the switch 38 from the register 32 to the address bus 16. Upon receipt of this address, a high byte AD0H of the "transfer destination address" AD0, which shows the initial storage destination of the program data in the functional circuit to serve as the first transfer destination is read from the ROM 10 via the data bus 18 (Step S12).

The high byte AD0H of the transfer destination address AD0 read via the data bus 18 from the ROM 10 is directly transferred to the internal bus 20 and is loaded via this bus 20 to the write-enabled functional circuit FC that serves as the first transfer destination. At this time, the control unit 40 sets signal, identification information ADT on a signal identifying line 22 to a logic value indicating an address transmission mode, for example, H level. Also, the control unit 40 increments the contents of the register 32 by one and updates the ROM read address by one along with incrementing the contents of the register 36 by one and decreasing the remaining program data length LK by one (Step S12).

In the next read cycle, an address (VK-1+4) is output via the switch 38 from the register 32 to the address bus 16, and a low byte AD0L of the transfer destination address AD0 is read from the ROM 10 (Steps S11, S12). Then, in the same manner as in the previous cycle, the low byte AD0L of the transfer destination address AD0 that has been read out is loaded via the internal bus 20 into the functional circuit FC serving as the first transfer destination.

In the next read cycle, an address (VK-1+5) is output via the switch 38 from the register 32 to the address bus 16, and, upon receipt of this address, an initial single byte DA(1) of the first group of program data corresponding to the first transfer destination is read out from the ROM 10.

This single byte of program data Da1 is loaded into the functional circuit FC serving as the first transfer destination via the internal bus 20. At this time, the control unit 40 sets the signal discrimination information ADT to a logic value indicating data transmission mode, for example, L level. Based on this, the single byte of program data Da(1) is loaded into the storage address indicated by the transfer destination address AD0 previously loaded in said functional circuit.

Read cycles identical to the ones described above are then repeated, so that during each cycle one byte of the first group of program data corresponding to the first transfer destination is read out from the ROM 10, transferred to the functional circuit FC serving as the first transfer destination via the internal bus 20, and loaded into the corresponding storage location in the functional circuit.

Each time the above-described read cycle is carried out, the control unit 40 increments the address value in the register 32 by one while decrementing the remaining program data length LK in the register 36 by one.

Then, when LK in the register 36 reaches 0, it is recognized that the transmission of the program data corresponding to the first transfer destination has been completed, the data read from the ROM 10 in the next cycle is determined to be transfer destination discrimination data DFC1 used for identifying the next (second) transfer destination, and this data DFC1 is set into register 34 (Steps S11, S6).

An operation identical to the operation used for the first transfer destination described above is then repeated (Steps S6□S7□S8□S9□S10□S11□S12□. . . □S11□S6). Then, when all the necessary program data has been transferred to the final transfer destination and end-indicating data DFend is read from the immediately following ROM address, at this point, the entire processing for the Kth set of program data ends (Steps S7, S1).

Figure 7:
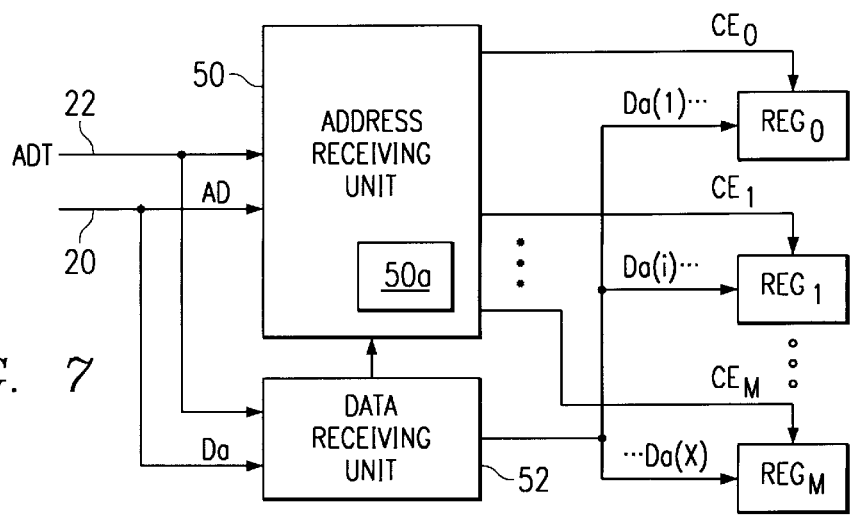
FIG. 7 is a block diagram showing a configuration of a program data loading unit provided in functional circuits in the system according to the embodiment.

FIG. 7 shows an example of a circuit configuration used for loading program data from the program loader 12 in the functional circuits FC.

The functional circuits FC are provided with a data receiving unit 52 and an address receiving unit 50 which respectively receive data and address signals from the internal bus 20.

The address receiving unit 50 has an address register 50a and stores addresses used for addressing in units of bytes in the address register 50a in the storage area of one or multiple registers Reg0, Reg1, . . . RegM or memories holding program data in said functional circuits FC.

The data receiving unit 52 is made up of a data buffer temporarily holding received data, with its data output terminals connected to the data input terminals of the memories or registers Reg0, Reg1, . . . RegM.

During program data allocation from the program loader 12, as was described above, first of all, an address transmission mode is indicated by changing the level of the signal identification information ADT on the signal identification line 22 to an H level, and the address receiving unit 50 receives the initial 2-byte data ADH, ADL transmitted in this mode as a "transfer destination address" AD. The address receiving unit 50 stores the received transfer destination address AD in the address register 50a.

Next, the signal identification information ADT is changed to an L level, and data then sent via the internal bus 20 is received by the data receiving unit 52. At this time, the address receiving unit 50 write-enables the memory addresses or register addresses designated by the addresses stored in the address register 50a. Thus, the data received in the data receiving unit 52 is written to the selected addresses. Immediately thereafter, the address control unit 50 [sic] increments the contents of the address register 50a by one and updates one write address value.

Thus, data in units of 1 byte transferred from the program loader 12 is loaded into the storage addresses of the corresponding registers or memories via the data receiving unit 52.

In addition, the sample configuration of FIG. 7 is only an example; various modifications are permitted. In particular, various circuit configurations of the prior art can be used for addressing or selecting the desired register or memory addresses in the functional circuits FC.

As was described above, in the system according to the present embodiment, along with storing and holding a plurality of sets of program data respectively corresponding to a plurality of operating modes or applications in specified storage areas in the ROM 10 separately for each set, address pointers indicating the storage addresses of each set of program data are stored in predetermined storage addresses in the ROM 10, and when a program number PN corresponding to any one of the address pointers is supplied from an external microprocessor 14 in order to designate the desired group of program data, the program loader 12 reads the corresponding address pointer from the ROM 10 based on the program number PN and determines the storage location of the target set of program data based on said address pointer.

Therefore, the microprocessor 14 may handle only the program numbers PN corresponding to the operating modes. If the storage locations of the program data sets stored in the ROM 10 are changed, the items that must be changed along with them are only the values of the address pointers in the ROM 10, and changes or modifications outside the ROM 10 are unnecessary. In particular, there is no need to make changes to the software of the microprocessor 14.

Also, because in the system according to the present embodiment, reading of program data from the ROM 10 and its transfer to various functional circuits is carried out not by a microprocessor 14 but by a program loader 12, which can be made up of hardware circuits only, the loading of program data can be executed at high speed using a minimum number of steps.

Incidentally, as was described above, it is possible to add the program loader 12 to one of the functional circuits FC in this system. To do this, a circuit such as the one shown in FIG. 7 may be provided in the control unit 40. The control unit 40 can change the characteristics of the above-mentioned program loading operation in programmable fashion in accordance with the set value loaded in a built-in set value register Reg.

As an appropriate example of this system, there is a method for controlling the access time (speed) of ROM readout in programmable fashion as explained hereinbelow.

Among commercially available ROMs, there are memories with a short access time (fast memories) and a long access time (slow memories), with a considerable variation in this regard. In the system according to the present embodiment, a ROM 10 that can be easily installed and removed is preferable, and in such a case, either a slow ROM or a high-speed ROM can be connected. To be able to access all ROMs using a uniform access time, one is restricted to the slowest speed in the specifications. However, this means carrying out memory access at speeds that are far slower than the specification speed in the case of connecting a high-speed ROM, resulting in decreased efficiency of program data loading processing.

Thus, in an embodiment of the present invention, along with adding a program loader 12 to one of the functional circuits in the system, data representing the specification access time set in said ROM is included in the program data group corresponding to the program loader 12 among the program data sets stored in the ROM 10. Then, the slowest access time is preset as the initial value of the ROM access time in the control unit 40 in the program loader 12. In addition, it is desirable for the program loader 12 to be preset to the first transfer destination.

Thus, when the program loader 12 receives a program number PN from the microprocessor 14, the readout of program data from the ROM 10 starts using the above-mentioned slowest preset access time.

In the above-described example, memory access is carried out using the slowest preset access time from the readout of the address pointer to at least the readout of the transfer destination address AD. Therefore, no matter what specification access time the ROM 10 has, the access speed of the program loader 12 cannot be so high as to render readout impossible.

Then, after the program loader 12 has read out data regarding the standard access time for this ROM from the ROM 10 and loaded them in its own set value register, the access speed is changed to the standard access time, and the loading processing of this group of program data is continued.

Therefore, when the ROM 10 is a high-speed ROM, starting from the moment of switching, the reading of program data is carried out using high-speed memory access, resulting in a spectacular reduction of the overall time required for loading processing. Also, when the ROM 10 is a memory of intermediate speed, reading of program data is carried out using intermediate speed memory access, which makes it possible to achieve a considerable reduction in the overall loading processing time.

Thus, regardless of the specification access time of the ROM used as the ROM 10, memory access can be executed in a completely reliable fashion using an access time matching the specification speed of this ROM.

Figure 8:
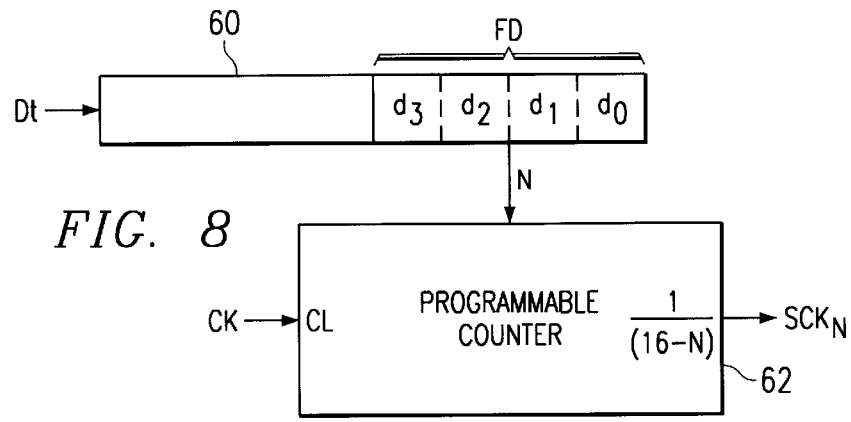
FIG. 8 is a block diagram showing a configuration of a memory access time changeover unit that can be incorporated into a program loader in the system according to the embodiment.
Figure 9:
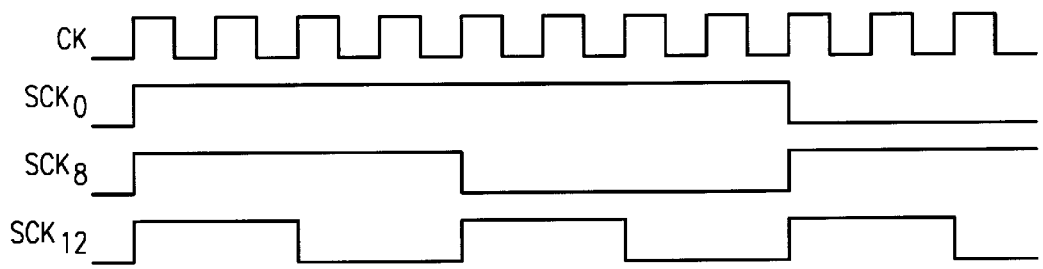
FIG. 9 is a timing diagram showing the waveforms of the operating clock signals obtained in the memory access time changeover unit.

To carry out the above-described change of access speed in the program loader 12, a programmable counter 62 and a set value register 60, such as the ones shown in FIG. 8, may be provided in the control unit 40. The standard access time data Dt of the ROM 10 described above is loaded into a specified field FD of the set value register 60, for example, as four-bit data (d3, d2, d1, d0), and is supplied to the program input terminal of the programmable counter 62 as a set a value N.

The programmable counter 62 receives input of a reference clock CK corresponding to the fastest access time and operates as a counter dividing the reference clock CK0 by (16-N) with respect to the set value N received by the program input terminal. Each unit in the program loader, particularly the control unit 40, operates at a clock speed SCKN output from the programmable counter 62.

At the moment when the ROM readout starts, an initial value "0" is preset in the field FD of the set value register 60, so that (d3, d2, d1, d0) is (0, 0, 0, 0) and a set value of "0" is supplied to the program input terminal of the programmable counter 62. Thus, the programmable counter 62 operates as a 16-bit counter, outputting a clock SCK0 having a speed of ¹⁄₁₆ of the reference clock CK. Therefore, the program loader 12 accesses the ROM 10 using an access time (for example, 500 nsec) corresponding to this slowest clock SCK0.

As was described above, standard access time data Dt is loaded into the field FD of the set value register (60) from the ROM 10, and, for instance, when this value is "15," a set value of "15" is supplied to the program input terminal of the programmable counter 62, and a clock SCK15 having the same speed as the reference clock CK is output from the output terminal of the programmable counter 62. Thus, the program loader 12 accesses the ROM 10 using an access time (for example, 500 nsec) corresponding to this highest clock SCK0.

Figure 10:
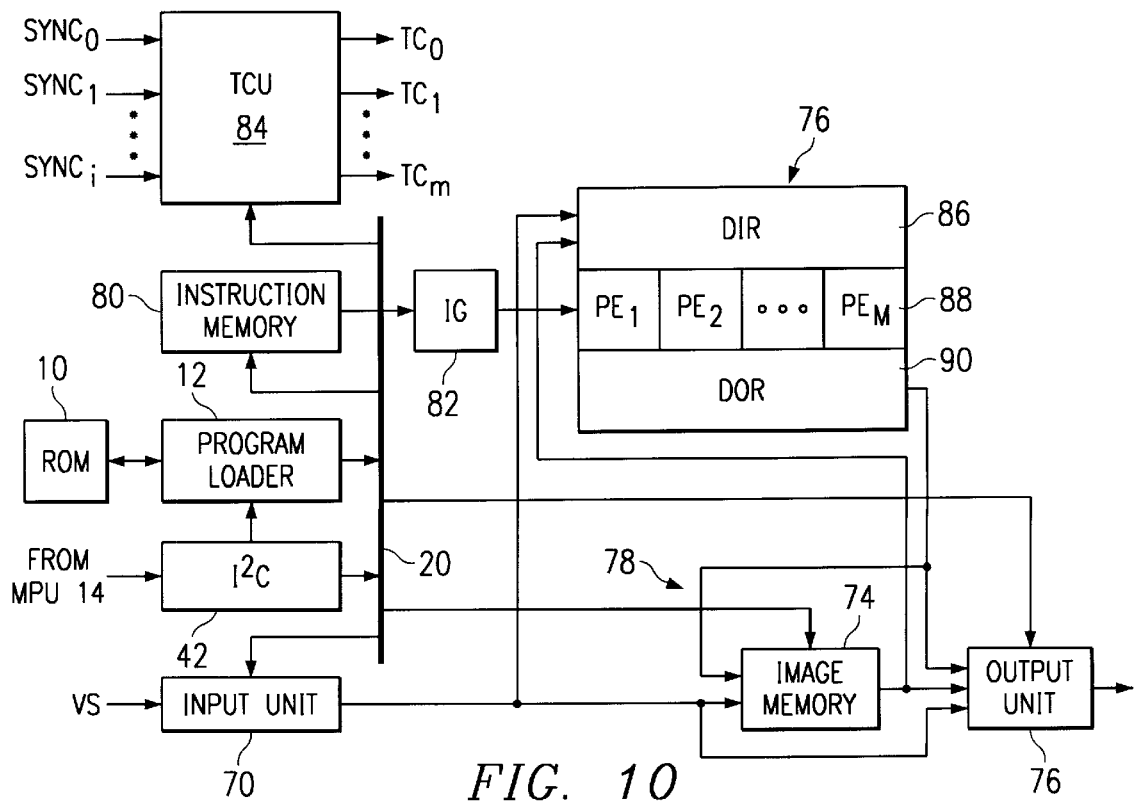
FIG. 10 is a block diagram showing the circuit configuration of an image processor which is one of the specific examples of application of the system according to the embodiment.

FIG. 10 shows the circuit diagram of an image processor as an example of a specific application of a system based on this embodiment.

The image processor has an input unit 70, accepting input of digital video signals VS from the outside as image data to be processed, an SVP (Scan-line Video Processor) 72 receiving image data in scan line units, processing them and outputting the results, an image memory 74 writing and reading image data in scan line units, an output unit 76 outputting image data after processing to the outside, and a data bus 78 interconnecting the input unit 70, SVP 72, image memory 74, and output unit 76.

Also, in order to allow the SVP 72 to operate as an SIMD (Single-Instruction Multiple-Data) type digital signal processor, in this image processor there are provided an instruction memory 80 made up of a RAM holding programs used for the SVP 72, and an instruction generating circuit (IG) 82 obtaining instructions one by one from the instruction memory 80 and supplying micro-instructions and other control signals corresponding to the instructions to the SVP 72.

Furthermore, a timing control unit (TCU) 84, which supplies the necessary timing control signals to the input unit 70, SVP 72, image memory 74, output unit 76 and IG 82, is also provided in the image processor.

The input unit 70, digital signal processor units 72, 80, 82, image memory 74, output unit 76 and the TCU 84 in this image processor operate in accordance with the respective supplied program data, corresponding to the functional circuits FG0, FG1, . . . FGn of FIG. 1.

Then, a program loader 12 and an I$^2$C interface circuit 42, which are used for distributing the desired program data from the ROM 10 via an internal bus 20 to the program data holding units (memory, registers, and such inside the units of the image processor, in other words, the input unit 70, SIMD type digital signal processor units 72, 80, 82, image memory 74, output unit 76, and IG 82, are also included. In addition, a clock circuit, not shown, which consists, for example, of a PLL circuit, and is used for supplying the necessary clock pulses to the units in the processor, is also included.

The SVP 72 has a three-layer structure consisting of a data input register (DIR) 86, a processing element unit (processor unit) 88, and a data output register (DOR) 90.

The DIR 86 operates in accordance with addresses (ADDRESS supplied from the IG 82, the clock supplied from the clock circuit, and the timing control signals supplied from the TCU 84, repeatedly executing input of image data D1~DN for up to a maximum of three channels (for example, 48 bits) in scan line units.

The processor unit 88 is constructed by arranging (connecting) processing elements PE1~PEn in parallel, whose number is equal to the number of pixels N in a horizontal scan line (for example, 864). The processing elements PE1~PEn operate in parallel in accordance with addresses (ADDRESS) and micro-instructions (MICROINSTRUCTION) from the IG 82 and clock pulses from the clock circuit, executing the same image processing calculations for each corresponding piece of image data D1, D2, . . . , DN within one horizontal scan period.

The DOR 90 operates in accordance with addresses (ADDRESS) supplied from the IG 82, clock pulses from the clock circuit, and control signals from the TCU 84, combining and outputting the data which is the result of the arithmetic processing by the processing elements PE1~PEN for each single horizontal scan period in the form of image data D1'~DN' constituting one horizontal scan line for up to a maximum of three channels.

The clocks supplied to the DIR 86, processor unit 88, and DOR 90 may be mutually asynchronous. Also, data transfer from the DIR 86 to the processor unit 88 and data transfer from the processor unit 88 to the DOR 90 are carried out within respective horizontal blanking periods.

In this manner, input of data for one horizontal scanning line, its parallel arithmetic processing, and data output are carried out by the DIR 86, processor unit 88 and DOR 90 under the pipeline system in an asynchronous, parallel manner, carrying out real-time image processing.

In addition, the desired program data (instructions) are loaded into the instruction memory 80 of the SIMD type digital signal processor unit from the program loader 12 via an internal bus 20.

The image memory 74, which has an SDRA (Synchronous Dynamic Random Access Memory) as a high-speed memory temporarily storing image data, also has a single interface unit (SDRAM interface unit) including a number of input/output interfaces for carrying out data write/read operations in a parallel and independent manner.

The control unit of this SDRAM interface unit has a set value register, and exercises control over memory access to SDRAM, as well as control over writing/reading to/from the input buffers and output buffers in accordance with the timing control signals from the TCU 84 and program data loaded into this register from the program loader 12.

The TCU 84 has a program memory, a sequential memory, and the like, storing program data from the program loader 12 in these memories. Then, timing control signals necessary for the various units of the system are supplied synchronously with the pixel clock, horizontal synchronizing signals, and vertical synchronizing signals extracted from input image signal, based on this stored program data.

Because in this image processor the SIMD type digital image processor units (in particular, the SVP 72) and the image memory 74, which is capable of executing write and read operations in a parallel and independent fashion, are mutually interconnected via a data bus 78 and each unit in the processor (functional circuits) is operated in a programmable fashion in accordance with the program data loaded from the program loader 12, a small-scale circuit configuration allows for implementing high-level and diverse image processing.

Although in the above-described embodiment a ROM was utilized as the program memory used for storing program data in the system of the present invention, needless to say, a RAM (random-access memory) can be used instead. Also, the unit data length, storage positions or storage locations of the various data (address pointers, program data) and the like stored in such a program memory can be freely selected. Any systems known in the prior art can be used as methods for transferring program data read from the program memory to the functional circuits.

Because in the above-described embodiment program numbers directly representing the storage addresses of the address pointers were used as program identification information, the corresponding address pointers can be readily looked up by using a simple data operation. However, if the program loader is furnished with the necessary decoding functions, it is possible to use appropriate codes instead of the program numbers (address values) as program designation information. Also, although in the above-described embodiment program designation information was supplied to the program loader by the microprocessor 14, it is possible to supply it from any circuit.

Also, in the above-described embodiment, the address pointers directly represented the storage addresses of the corresponding sets of program data. However, an indirect method is also possible, and, for example, the storage addresses of the corresponding sets of program data can be determined by carrying out certain arithmetic processing on the address pointers.

As was described above, the method and apparatus for program data loading of the present invention are so constructed that, along with storing a plurality of sets of program data separately for each set in specified storage areas in a program memory, address pointers indicating the storage addresses of each set of program data are stored at predetermined storage addresses in the program memory, and when program designation information corresponding to any single address pointer is given in order to designate the desired set of program data by the program designating means, the program loader, based on the program designation information, reads out the corresponding address pointers from the program memory, and the storage locations of the target sets of program data are computed based on the address pointers. Thus, even if the data length and storage addresses of the program data stored in the program memory are changed, there is no need for software modification, and, moreover, the loading processing of program data can be carried out at high speed and efficiently.

REFERENCE NUMERALS AS SHOWN IN THE DRAWINGS

In the FIG. 10 a ROM (program memory), 12 a program loader, 14 a microprocessor, 16 an address bus, 18 a data bus, 20 an internal bus, 22 a bus signal identification line, 24 a write control line, FC0, FC1, . . . , FCn, functional circuits, 30, 32, 34, 36 registers, 36 an address changeover switch, and 40 a control unit.

What is claimed is:

1. A program loading method for loading the desired program data in one or more functional circuits carrying out specified operations in accordance with supplied program data, the program loading method having a step in which a plurality of sets of program data are held by storing them separately for each set in specified storage areas in a program memory along with holding address pointers indicating the storage addresses of each set of program data at predetermined storage addresses in the program memory, a step in which program designation information corresponding to any single pointer among the address pointers is given in order to designate the desired set of program data, a step in which, based on the program designation data, the address pointers corresponding thereto are read out, and the storage addresses of the sets of program data that the program designation information designates are computed in accordance with the read-out address pointers, and a step in which the sets of program data that the program designation information designates are read out from the computed storage addresses and the read-out program data is transferred to the above-mentioned corresponding functional circuits, and which transfer destination identification information used for identifying the functional circuits which are to serve as transfer destinations is contained in a specified first portion of each group of program data.

2. The program loading method according to claim 1 in which a group of program data corresponding to the above-mentioned functional circuits is stored at consecutive storage addresses in the storage areas in which sets of program data are stored in the above-mentioned program memory.

3. The program loading method according to claim 1 in which transfer program length information used for representing the length of the program data to be transferred to the functional circuits which are to serve as transfer destinations is contained in a specified second portion of each group of program data.

4. The program loading method according to claim 1 in which the above-mentioned program designation information is information representing the storage addresses of the above-mentioned pointer information corresponding thereto.

5. A program loading apparatus loading the desired program data in one or more functional circuits carrying out specified operations in accordance with supplied program data, the program loading apparatus having a program memory holding a plurality of sets of program data by storing them in specified storage areas along with holding address pointers indicating the storage addresses of each set of program data at predetermined storage addresses, a program designating means giving program designation information corresponding to any single pointer among the address pointers in order to designate the desired set of program data, a program loader which, based on the program designation information from the program designating means, reads out the address pointers corresponding thereto and, by accessing the storage addresses of the sets of program data that the program designation information designates in accordance with the read-out address pointers, reads out the sets of program data that the program designation information designates and transfers the read-out program data to the corresponding functional circuits, and which memory access time settings representing the access time set for the above-mentioned program memory are stored in specified storage locations in the above-mentioned program memory, with the above-mentioned program loader starting the readout of program data from the above-mentioned program memory according to a preset low-speed access time and carrying out the reading of program data from the above-mentioned program memory in accordance with the access time indicated by the above-mentioned memory access time settings after having read out the above-mentioned access time data.

6. The program loading apparatus according to claim 5 in which a group of program data corresponding to the program loader is stored in the starting portions of each set of program data indicated by the pointers, with the memory access time settings contained in the group of program data.

7. A program loading apparatus loading the desired program data in one or more functional circuits carrying out specified operations in accordance with supplied program data comprising:

a microprocessor;

a program loader circuit connected to the microprocessor;

a program memory connected to the program loader circuit holding a plurality of sets of program data by storing them in specified storage areas along with holding address pointers indicating the storage addresses of each set of program data at predetermined storage addresses, a program designating means in the program loader for storing program designation information corresponding to any single pointer among the above-mentioned address pointers in order to designate the desired set of program data, wherein the program designating means reads out the address pointers corresponding to a set of program data and, by accessing the storage addresses of the sets of program data that the above-mentioned program designation information designates in accordance with the read-out address pointers, reads out the sets of program data that the above-mentioned program designation information designates and transfers the read-out program data to the above-mentioned corresponding functional circuits.

8. The program loading apparatus according to claim 7 in which memory access time settings representing the access time set for the program memory are stored in specified storage locations in the program memory, with the program loader starting the readout of program data from the program memory according to a preset low-speed access time and carrying out the reading of program data from the program memory in accordance with the access time indicated by the memory access time settings after having read out the access time data.

9. The program loading apparatus according to claim 8 in which a group of program data corresponding to the program loader is stored in the starting portions of each set of program data indicated by the pointers, with the memory access time settings contained in the group of program data.

* * * * *